United States Patent [19]

Smid

[11] E Patent Number: Re. 32,988

[45] Reissued Date of Patent: Jul. 18, 1989

[54] SINGLE COLLIMATOR LENS HAVING ONE ASPHERICAL SURFACE

[75] Inventor: Albert Smid, Eindhoven, Netherlands

[73] Assignee: U.S. Philips Corp., New York, N.Y.

[21] Appl. No.: 201,495

[22] Filed: Jun. 1, 1988

Related U.S. Patent Documents

Reissue of:

[64] Patent No.: 4,592,627
Issued: Jun. 3, 1986
Appl. No.: 593,003
Filed: Mar. 23, 1984

[30] Foreign Application Priority Data

Dec. 7, 1983 [NL] Netherlands ..... 8304212

[51] Int. Cl.[4] ..... G02B 3/02
[52] U.S. Cl. ..... 350/432
[58] Field of Search ..... 350/432

[56] References Cited

U.S. PATENT DOCUMENTS

| | | | |
|---|---|---|---|
| 2,530,397 | 11/1950 | Merte . | |
| 3,508,811 | 4/1970 | Yoshida . | |
| 3,917,766 | 11/1975 | Howden | 350/417 |
| 4,074,314 | 2/1978 | Velzel et al. | 350/432 |
| 4,415,238 | 11/1983 | Braat et al. | 350/432 |
| 4,431,267 | 2/1984 | Finck et al. . | |
| 4,489,408 | 12/1984 | Verhoeven et al. | 369/112 |

FOREIGN PATENT DOCUMENTS

| | | |
|---|---|---|
| 2107483 | 4/1983 | United Kingdom . |

*Primary Examiner*—Bruce Y. Arnold
*Assistant Examiner*—Rebecca D. Gass
*Attorney, Agent, or Firm*—William L. Botjer

[57] ABSTRACT

A collimator lens has a small numerical aperture and a specific focal length. One of the surfaces of the lens is planar and the other surface is aspherical. The aspherical surface is defined by a series expansion with only a few even terms.

9 Claims, 1 Drawing Sheet

SINGLE COLLIMATOR LENS HAVING ONE ASPHERICAL SURFACE

Matter enclosed in heavy brackets [ ] appears in the original patent but forms no part of this reissue specification; matter printed in italics indicates the additions made by reissue.

BACKGROUND OF THE INVENTION

The invention relates to a single collimator lens having one aspherical surface. The invention also relates to an optical system producing a collimated radiation beam and to an optical scanning unit provided with such an optical system.

Netherlands Patent Application No. 8103323 (corresponding to U.S. Pat. No. 4,415,238) discloses a single lens having one aspherical surface (a monaspherical lens). This lens is suitable for use as an objective lens in an optical scanning unit for reading from or recording on an information surface of an optical record carrier.

The information surface must be scanned with a minute radiation spot whose diameter is on the order of 1 μm. Consequently, the lens must have a comparatively large numerical aperture. Further, the objective lens must have a comparatively large diffraction-limited field in order to form a sharp radiation spot at points which are radially offset from the optical axis of the objective. This is necessary to correct for minor deviations in the position of the radiation spot relative to a track pattern in the information surface. The requirements of a comparatively large numerical aperture (N.A. larger than 0.25) and a large diffraction-limited field can be met by a monaspherical lens whose second surface is spherical. The first surface is highly aspherical and has a shape which is defined by a series expansion with a multitude of terms.

SUMMARY OF THE INVENTION

It is an object of the present invention to provide a monaspherical lens whose geometry is substantially simpler and which is easier to manufacture than prior monaspheric lenses, and yet which is extremely suitable for the collimating a diverging radiation beam produced by a radiation source such as a diode laser.

The monaspherical collimator lens according to the invention has a numerical aperture less than 0.25 and a focal length between approximately 16 mm and approximately 24 mm. The second surface of the lens is planar, and the aspherical surface is defined by the expression $$Z = E_2R^2 + E_4R^4 + E_6R^6,$$

Where R is the distance between a point on the aspherical surface to the optical axis of the lens, and Z is the distance between the projection of the point on the optical axis and the point of intersection of the optical axis and the aspherical surface. The coefficients $E_2$, $E_4$ and $E_6$, which are functions of the refractive index n and the focal length f in mm, are given by the equations $$E_2 = \frac{1}{40 \cdot (n-1)} \left(\frac{f}{20}\right)^{-1}$$

$$E_4 = \{(2.710893 - 3.626513 \cdot n + 1.120858 \cdot n^2) \cdot 10^{-4} + E_2^3\} \left(\frac{f}{20}\right)^{[3]-3}$$

$$E_6 = \{(2.825115 - 3.1865364 \cdot n + 0.8904979 \cdot n^2)10^{-6} + E_2^5\} \left(\frac{f}{20}\right)^{[5]-5}$$

The invention is based on the discovery of the fact that a collimator lens with a small numerical aperture may be made of a single element having one plane surface and one aspherical surface of comparatively simple shape. The aspherical surface may be defined by a series expansion with even terms. The series may be terminated after the third term. The wavefront aberration caused by the omission of the higher-order terms is well below the marechal criterion.

An optical scanning unit in which the collimator lens according to the invention is employed comprises a radiation source, for example a diode laser, which emits an asymmetrical beam (i.e. a beam whose aperture angle in one plane is greater than that in a second plane perpendicular to the first plane). Moreover, this beam is astigmatic, which means that a normal lens does not focus this beam in one focal point but in two focal lines which are perpendicularly and axially offset from each other. In an optical scanning unit, a collimator lens with a sufficiently small numerical aperture, for example N.A.=0.11 is used to make the diode laser beam more symmetrical at the expense of some intensity. The smaller depth of field of a lens with a smaller numerical aperture enables the astigmatism to be reduced to an acceptable level.

In comparison with a monaspherical lens with one spherical surface, a monaspherical lens having a plane surface (a plano-aspherical lens) is simpler to manufacture. This is because a plane surface is simpler to manufacture than a spherical surface, and because the aspherical surface of the plano-aspherical lens is less likely to become off-centered. During the manufacture of the plano-aspherical lens, only the angular position need be aligned.

It is to be noted that a single lens having one aspherical surface and one plane surface has been described in, for example, U.S. Pat. No. 2,530,397. The lens described therein has a planar front face and an aspheric rear face in the form of a second-order generated surface. This lens must be combined with an aperture at some distance from the lens body. The rear face is made aspherical in order to render the lens, which is required to have a large field nonastigmatic. In contrast, the lens according to the invention has an aspherical surface in order to provide a correction for spherical aberration on and around the axis. The lens according to U.S. Pat. No. 2,530,397 therefore has a different aspherical profile than the lens according to the present invention.

German Patent Application No. 1,278,131 (corresponding to U.S. Pat. No. 3,508,811) describes a lens having one spherical and one aspherical surface. It is stated that in the case of a lens having one plane surface, the spherical aberration can be eliminated by making the other surface aspherical. However, it is also stated that then the sine condition can no longer be satisfied, so that in practice a spherical surface will be chosen to satisfy the sine condition. The lens according to the invention is based on the discovery of the fact that for the present use, and for the corresponding specific numerical aperture and focal length, the sine condition need not be met.

Preferably, a collimator lens according to the invention comprises a glass plano-convex body. The convex surface is provided with a layer of a transparent plastic with an aspherical outer profile. The refractive index of the plastic layer is substantially equal to that of the glass body.

Substantial progress in the field of replication techniques enables this lens to be manufactured easily and cheaply in large quantities, once a mold is produced. The mold has a profile which is the negative of the aspherical outer profile to be formed. Such a mold may be pressed into a layer of a sufficiently softened plastic deposited on a glass preform. Thereafter, the plastic is allowed to cure, and the mold may be removed from the plastic-coated preform.

Preferably, the plastic is a substance which cures under the influence of ultraviolet radiation.

A second aspect of the invention concerns an optical system producing a collimated radiation beam. Such a system is described in the Netherlands Patent Application No. 8006061 (corresponding to U.S. Pat. No. 4,431,267). This system comprises a tubular holder, a semiconductor diode laser mounted in the holder, and a collimator lens system which is also arranged in the holder. This lens system comprises either two spherical lenses or one spherical lens. An optical system, modified according to the invention, for producing a collimated radiation beam comprises a single plano-aspherical collimator lens as described above, in which the plane surface is directed toward the diode laser.

The optical system which produces a collimated radiation beam may form part of an optical scanning unit for scanning an information surface of a record carrier. The scanning unit further comprises an objective system focussing the collimated radiation beam so as to form a diffraction-limited radiation spot on the information surface.

DESCRIPTION OF THE PREFERRED EMBODIMENTS

Figure 1:
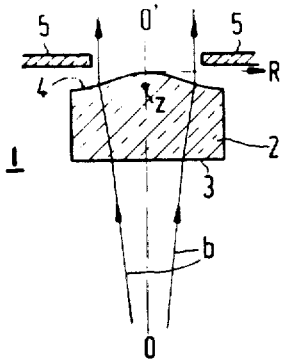
FIG. 1 is a cross-sectional view of a single collimator lens according to the invention.

FIG. 1 shows a plano-aspherical collimator lens 1 according to the invention. The lens 1 collimates the diverging beam b. The beam b is represented by its marginal rays, i.e. the rays which just pass the edge of the pupil 5.

The optical axis of the lens 1 is designated 0—0'. The rays which are incident on the plane surface 3 of the lens are refracted toward the optical axis. Then they traverse the lens body 2, and finally they are further refracted toward the axis by the aspherical surface 4 to emerge as parallel rays.

For the present use, the collimator lens 1 need have only a small numerical aperture and should have a high imaging quality only in an area which is small relative to the focal length. These requirements can be met by the plano-aspherical lens shown in FIG. 1. The advantage of this lens is that the optical quality and the focal length are determined wholly by the aspherical surface 4. This is essential for the manufacture of the lens. Only one "difficult" surface has to be formed, and the plane surface 3 may be used as a reference surface.

Preferably, the axis of symmetry of the rotationally symmetrical aspherical surface extends perpendicular to the plane surface 3. This axis of symmetry is then also the axis 0—0' of the lens. Thus, there are no centering problems as in the case of a lens having a one aspherical and one spherical surface.

Surprisingly, it has been found that the aspherical surface 4 of the plano-aspherical lens with a numerical aperture smaller than 0.25 can be defined entirely by $$Z = E_2R^2 + E_4R^4 + E_6R^6 + E_8R^8$$

(i.e., by a series expansion which is terminated after the fourth term). For known aspherical surfaces, higher order terms, for example up to and including the fourteenth term, must be included. However, according to the invention, if the lens material has a refractive index n larger than 1.65, the term $E_8R^8$ may also be omitted. $E_8R^8$ may also be omitted for a numerical aperture smaller than 0.20, regardless of the value of n.

For a plano-aspherical lens having a refractive index between approximately 1.65 and approximately 2, a numerical aperture smaller than 0.25, and a focal length of 20 mm $E_2$, $E_4$ and $E_6$ are given by:

$$E_2 = \frac{1}{40 \cdot (n - 1)}$$

$$E_4 = (2.710893 - 3.626513 + 1.120858n^2)\, 0.10^{-4} + E_2^3$$
$$E_6 = (2.825115 - 3.1865364 + 0.8904979n^2)\, 0.10^{-6} + E_2^5$$

The lens may have a focal length of approximately 16 mm to approximately 24 mm. For focal lengths other than 20 mm, the above values for $E_2$, $E_4$ and $E_6$ may simply be scaled accordingly, which means that the terms must be multiplied by $$\left(\frac{f}{20}\right)^{-1}, \left(\frac{f}{20}\right)^{[3]-3}, \text{ and } \left(\frac{f}{20}\right)^{[3]-5}.$$

respectively.

The lens is designed for an axial thickness d, i.e. the thickness measured along the optical axis, of approximately 2.5 mm. A variation of the axial thickness has only a slight influence on the lens behavior, and gives rise to only a small variation of $E_4$. Therefore, the axial thickness may differ considerably from 2.5 mm.

The lens may be thought to comprise a plano-convex base defined by the term $E_2R^2$ on which an aspherical layer defined by $E_4R^4 + E_6R^6$ is formed.

As shown in FIG. 1, the lens 1 may be made entirely of glass. Such a lens has satisfactory optical properties, but forming an aspherical surface on the glass lens is difficult and time consuming. A composite plano-aspherical lens as shown in FIGS. 2 and 3 is more suitable for mass production.

Figure 2:
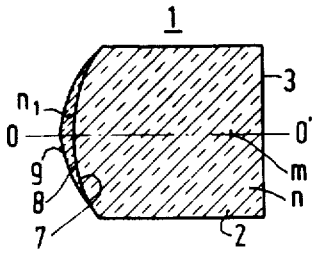
FIGS. 2 and 3 are cross-sectional views of single collimator lenses according to the invention. Each lens comprises a glass body and a plastic layer.
Figure 3:
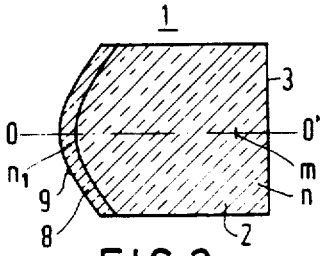

The lens 1 shown in FIG. 2 comprises a glass body 2 having a plane surface 3 and a spherical surface 7. The body 2 can be manufactured easily using conventional methods. A layer 8, made of a transparent plastic with an aspherical outer profile 9, is provided on surface 7. The plastic may be thermosetting plastic, but preferably it is a substance which is polymerizable under the influence of ultraviolet radiation.

The plastic layer 8 is soft and moldable when deposited on the glass body 2. Then, a mold having a surface profile which is the negative of the desired profile 9, is pressed into the layer 8. Subsequently, the plastic is exposed and the mold is removed so that the lens is obtained without any further operations.

The plastic layer 8 of the plano-aspherical lens shown in FIG. 2 has a thickness which varies substantially, for example from 2 μm to 50 μm. For replicating surface profiles in plastic, it is technologically desirable that relative thickness differences in the plastic layer be minimized. In order to achieve this, a part of the glass body 2 may be replaced by plastic layer increases, thereby reducing the relative thickness differences.

In the lens shown in FIG. 3, the thickness of the plastic layer is only a fraction of that of the glass body. As a result, the optical quality of the lens is hardly affected by the plastic layer whose properties are not as good as those of glass. The refractive index $n_1$ of the plastic layer should approximate the refractive index n of the glass as closely as possible.

Figure 4:
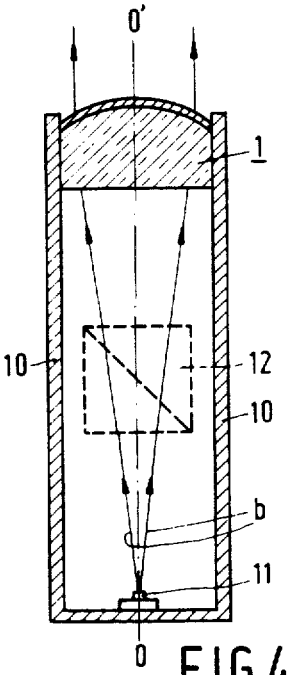
FIG. 4 is a partly cross-sectional, partly schematic view of an optical system for producing a collimated radiation beam.

FIG. 4 shows a optical system for producing a collimated radiation beam, also referred to as a collimator light pen. This light pen comprises a tubular housing 10. Housing 10 accommodates a semiconductor diode laser 11, for example an AlGaAs diode laser, and a plano-aspherical collimator lens 1 according to the invention. When the collimator light pen is us used in an apparatus for reading and/or recording a radiation-reflecting information surface in a record carrier, a beam splitter prism 12 is arranged between the diode laser 11 and the collimator lens 1 in order to separate the beam reflected by the information surface from the beam emitted by the diode laser.

Figure 5:
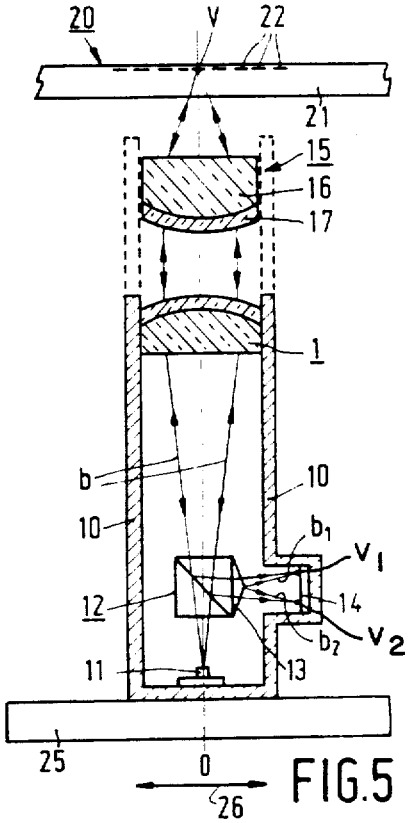
FIG. 5 is a partly cross-sectional, partly schematic view of an optical scanning unit.

FIG. 5 schematically shows an optical scanning unit employing a plano-aspherical collimator lens. This scanning unit comprises a collimator light pen as shown in FIG. 4 and an objective lens system 15. A small part of the radial cross-section of a round disc-shaped record carrier is designated 20. The information structure, which in the present case is radiation-reflecting, is situated on the upper side of the record carrier substrate 21 and comprises a multitude of information areas, not shown, arranged along information tracks 22.

The information structure is scanned by a read beam b produced by a diode laser 11. The collimator lens 1 forms the diverging beam into a parallel beam of such a cross-section that the pupil of the objective system 15 is filled completely. This objective 15 then forms a diffraction-limited radiation spot V on the information structure.

The read beam forming spot V is reflected by the information structure. As the record carrier moves relative to the read beam, the read beam is time-modulated in conformity with the information recorded in the information surface. By means of the prism 12, the modulated beam is separated from the beam emitted by the diode laser and is directed toward a radiation-sensitive detection system 14. This system supplies an electric signal which is modulated in conformity with the information stored in the record carrier.

In order to obtain a focusing-error signal which provides an indication of the magnitude and direction of a deviation between the plane of focusing of the objective system and the plane of the information structure, a roof prism 13 is arranged on the exit surface of the prism 12. Also, the detection system 14 comprises, for example, four detectors. The roof prism splits the reflected beam into two sub-beams $b_1$ and $b_2$ which form two radiation spots $V_1$ and $V_2$, respectively, in the plane of the detection system. Each of these radiation spots is associated with two detectors. For further details of the focusing-error detection system and the readout of the information structure, see British Patent Application No. 2,107,483 (corresponding to U.S. Pat. No. 4,489,408).

The objective system 15 may comprise a plurality of lens elements. However, preferably this objective system is a single plano-aspherical lens as described in Netherlands Patent Application No. 8304213, filed on Dec. 7, 1983 (corresponding to U.S. patent application Ser. No. 589,909, filed Mar. 14, 1984). This objective may comprise a glass body provided with a layer of a plastic.

As shown in FIG. 5, the objective 15 may be arranged outside of the light pen 10. Thus, this objective may be radially movable over small distances on the order of some tens of μm in order to eliminate tracking errors. However, it is alternatively possible to arrange the objective inside the holder 10 so as to be slightly movable in a radial direction, as indicated by the broken lines in FIG. 5. The scanning unit may be arranged on a slide 25 which is radially movable, as indicated by the arrow 26, so that all information tracks 22 can be scanned sequentially.

I claim:

1. A collimator lens having first and second opposite surfaces and an optical axis extending through the surfaces, the first surface being aspherical and the second surface being planar, said lens having a numerical aperture less than 0.25 and having a focal length between approximately 16 millimeters and approximately 24 millimeters, said aspherical surface being defined by the expression $$Z = E_2R^2 + E_4R^4 + E_6R^6,$$

where R is the distance between a point on the aspherical surface and the optical axis, Z is the distance between a projection of the point onto the optical axis and the point of intersection between the optical axis and the aspherical surface, and $E_2$, $E_4$, and $E_6$ are constants determined by the equations $$E_2 = \frac{1}{40(n-1)}\left(\frac{f}{20}\right)^{-1}$$

$$E_4 = [(2.710893 - 3.626513n + 1.120858n^{n2})10^{-4} + E_2^3]\left(\frac{f}{20}\right)^{[3]-3}$$

$$E_6 = [(2.825115 - 3.186564n + 0.8904979n^2)10^{-6} + E_2^5]\left(\frac{f}{20}\right)^{[5]-5}$$

where n is the refractive index of the lens, and where f is the focal length, in millimeters, of the lens.

2. A collimator lens as claimed in claim 1, characterized in that the lens comprises:

a glass plano-convex base having a refractive index; and a transparent plastic layer, having an aspherical outer surface and having a refractive index substantially equal to the refractive index of the glass base, on the convex surface of the base.

3. A collimator lens as claimed in claim 2, characterized in that the plastic is ultraviolet-curable.

4. An optical system for producing a collimated radiation beam, said system comprising:

a tubular holder;

a diode laser arranged in the holder for emitting a radiation beam; and a collimator lens arranged in the holder to collimate the radiation being emitted by the laser;

characterized in that the collimator lens has first and second opposite surfaces and an optical axis extending through the surfaces, the first surface being aspherical and the second surface being planar, the planar surface being directed toward the laser, said lens having a numerical aperture less than 0.25 and having a focal length between approximately 16 millimeters and approximately 24 millimeters, said aspherical surface being defined by the expression $$Z=E_2R^2+E_4R^4+E_6R^6,$$

where R is the distance between a point on the aspherical surface and the optical axis, Z is the distance between a projection of the point onto the optical axis and the point of intersection between the optical axis and the aspherical surface, and $E_2$, $E_4$, and $E_6$ are constants determined by the equations $$E_2 = \frac{1}{40(n-1)}\left(\frac{f}{20}\right)^{-1}$$

$$E_4 = [(2.710893 - 3.626513n + 1.120858n^2)\,10^{-4} + E_2^3]\left(\frac{f}{20}\right)^{[3]-3}$$

$$E_6 = [(2.825115 - 3.1865364n + 0.8904979n^2)\,10^{-6} + E_2^5]\left(\frac{f}{20}\right)^{[5]-5}$$

where n is the refractive index of the lens, and where f is the focal length, in millimeters, of the lens.

5. An optical system as claimed in claim 4, characterized in that the lens comprises:

a glass plano-convex base having a refractive index; and a transparent plastic layer, having an aspherical outer surface and having a refractive index substantially equal to the refractive index of the glass base, on the convex surface of the base.

6. An optical system as claimed in claim 5, characterized in that the plastic in ultraviolet-curable.

7. An optical scanning unit for scanning an information surface in a record carrier with a radiation spot, said unit comprising:

an optical system for producing a collimated radiation beam; and an objective system for forming a diffraction-limited radiation spot from the collimated radiation beam;

characterized in that the optical system comprises:

a tubular holder;

a diode laser arranged in the holder for emitting a radiation beam; and a collimator lens arranged in the holder to collimate the radiation being emitted by the laser, said lens having first and second opposite surfaces and an optical axis extending through the surfaces, the first surface being aspherical and the second surface being planar, the planar surface being directed toward the laser, said lens having a numerical aperture less than 0.25 and having a focal length between approximately 16 millimeters and approximately 24 millimeters, said aspherical surface being defined by the expression $$Z=E_2R^2+E_4R^4+E_6R^6,$$

where R is the distance between a point on the aspherical surface and the optical axis, Z is the distance between a projection of the point onto the optical axis and the point of intersection between the optical axis and the aspherical surface, and $E_2$, $E_4$, and $E_6$ are constants determined by the equations $$E_2 = \frac{1}{40(n-1)}\left(\frac{f}{20}\right)^{-1}$$

$$E_4 = [(2.710893 - 3.626513n + 1.120858n^2)\,10^{-4} + E_2^3]\left(\frac{f}{20}\right)^{[3]-3}$$

$$E_6 = [(2.825115 - 3.1865364n + 0.8904979n^2)\,10^{-6} + E_2^5]\left(\frac{f}{20}\right)^{[5]-5}$$

where n is the refractive index of the lens, and where f is the focal length, in millimeters, of the lens.

8. An optical scanning unit as claimed in claim 7, characterized in that the lens comprises:

a glass plano-convex base having a refractive index; and a transparent plastic layer, having an aspherical outer surface and having a refractive index substantially equal to the refractive index of the glass base, on the convex surface of the base.

9. An optical scanning unit as claimed in claim 8, characterized in that the plastic is ultraviolet-curable.

* * * * *